Jan. 20, 1953   J. SPENCER   2,626,222
METHOD FOR MANUFACTURING PRINTING ROLLERS
Filed Sept. 1, 1948   2 SHEETS—SHEET 1
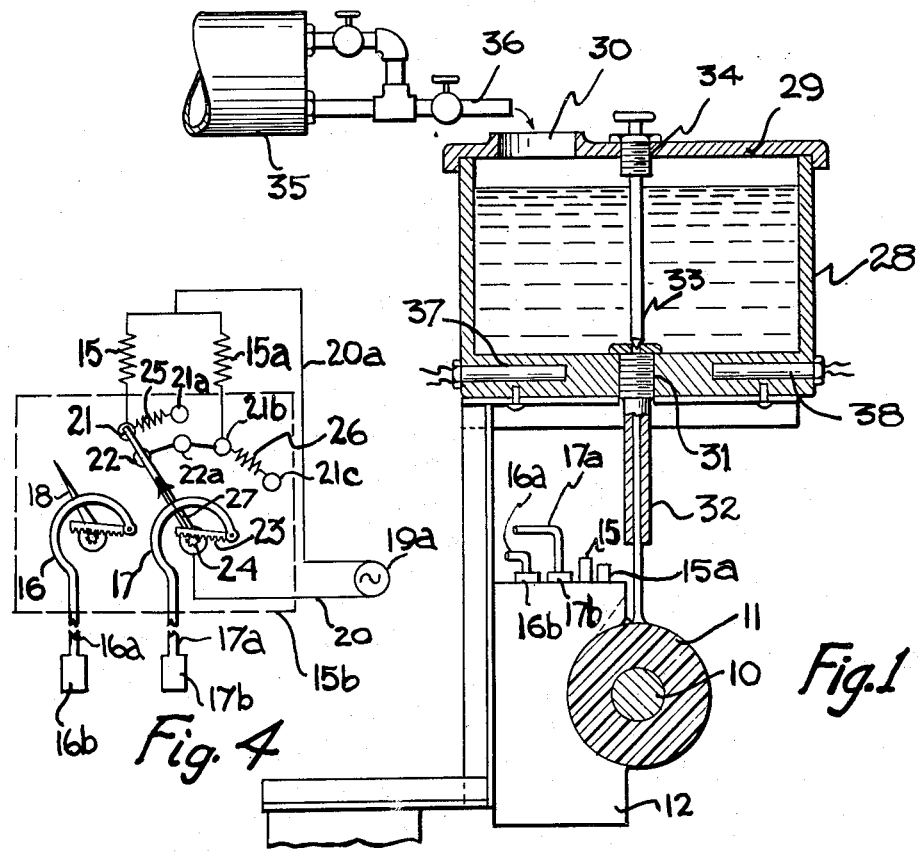
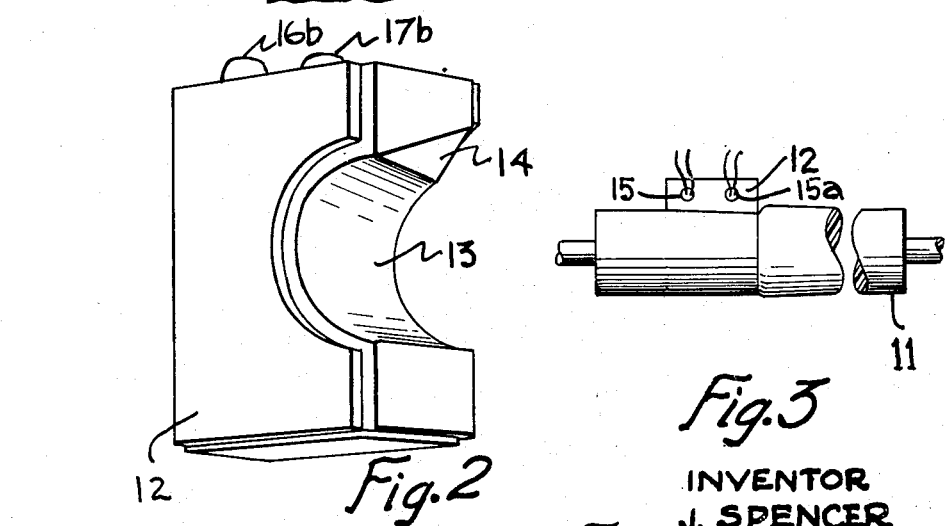
INVENTOR
J. SPENCER
Fetherstonhaugh & Co.
ATT'YS Jan. 20, 1953  J. SPENCER  2,626,222
METHOD FOR MANUFACTURING PRINTING ROLLERS
Filed Sept. 1, 1948  2 SHEETS—SHEET 2
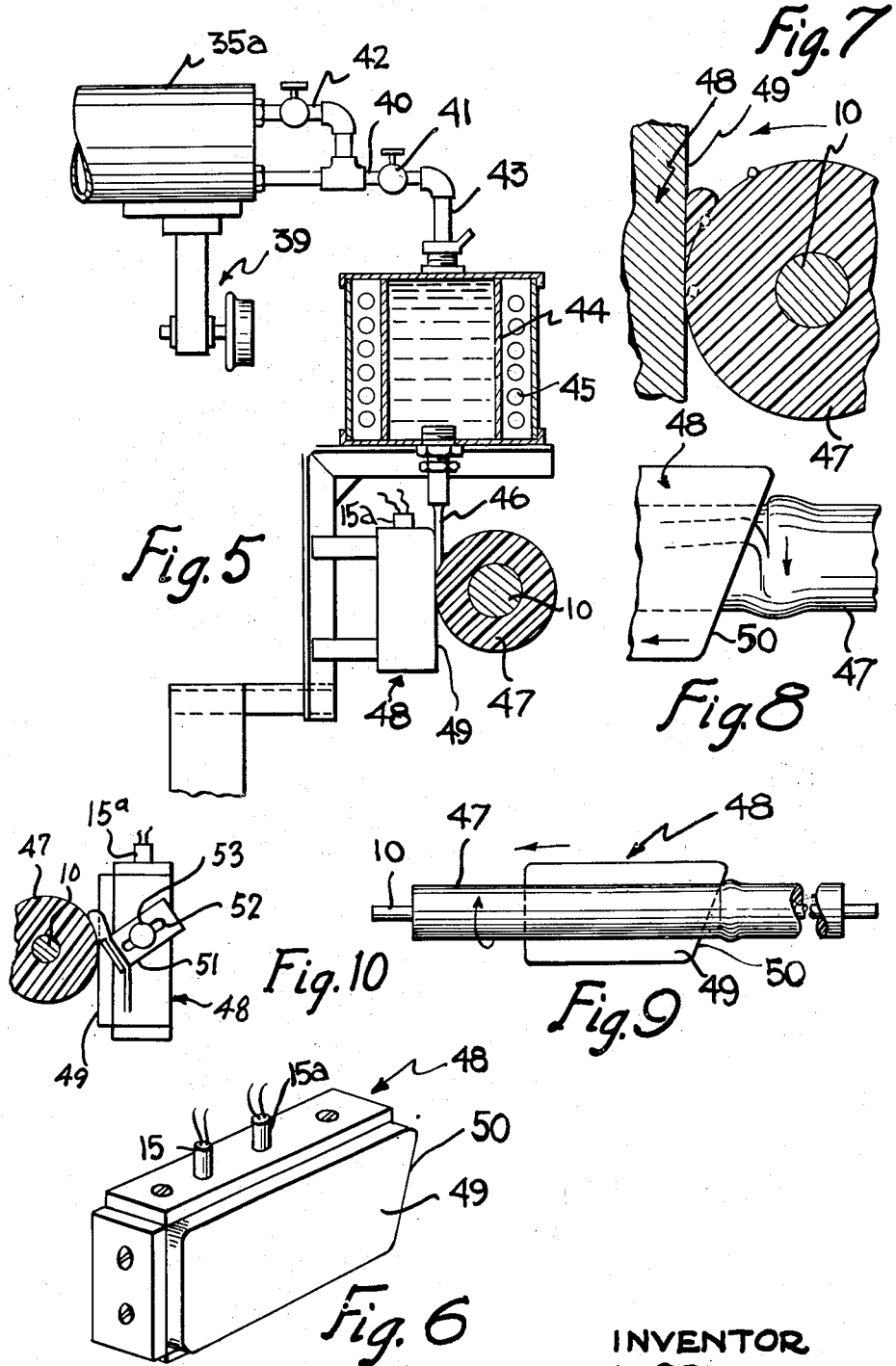
INVENTOR
J. SPENCER
Fetherstonhaugh & Co.
ATT'YS Patented Jan. 20, 1953

2,626,222

UNITED STATES PATENT OFFICE 2,626,222

METHOD FOR MANUFACTURING PRINTING ROLLERS

James Spencer, Toronto, Ontario, Canada

Application September 1, 1948, Serial No. 47,182

3 Claims. (Cl. 117—94)

This invention relates to a method and apparatus for manufacturing and trueing printing rollers made from thermo-plastic material.

The invention is particularly well adapted to the manufacture of printing rollers from the material described and claimed in my co-pending United States application Serial No. 735,297, now Patent No. 2,536,323, and to the trueing of such rollers, as well as to the trueing of conventional glue-glycerin rollers.

The conventional method of manufacturing printing rollers generally is to cast a re-meltable printing roller material such as a thermo-plastic material around a metallic core. Due to the difficulty of obtaining a true cylindrical mold, molding equipment for carrying out this operation has been unduly expensive and the cost of molded rollers has been correspondingly high.

This invention provides two alternative methods for overcoming the necessity of using an absolutely true tubular mold. On the one hand, using the apparatus hereinafter described, it is possible to build up a true roller around a core without using a mold. On the other hand, if desired, a roller may be molded in a mold formed from cheap commercial tubing and then trued by the method and apparatus of the invention.

Accordingly it is the object of the present invention to provide a method whereby thermo-plastic printing rollers may be built up without the use of a mold.

It is also an object of the invention to provide a method whereby thermo-plastic rollers which have become out of true, or which have been produced in a mold which is not absolutely true, may be economically and easily trued and surfaced.

It is another object of the invention to provide a method and apparatus for eliminating flaws in the surface material of printing rollers by eliminating faults in its surface and causing foreign bodies embedded therein to be projected deeply into the roller to leave a flawless inking surface.

With these and other objects in view the method of the invention generally consists in rotating the roller shaft at a controlled rate in a substantially horizontal plane, progressively melting a portion of the surface of the material by means of a heated platen passed longitudinally of the roller, and maintaining a pool of fused roller material between the platen and the roller during the passing of said platen.

The invention will be described in detail in conjunction with the accompanying drawings, in which:

Figure 1 is a partly diagrammatic cross sectional view of an apparatus according to the invention showing the general arrangement of parts.

Figure 2 is a perspective detail of one type of heated platen.

Figure 3 is a fragmentary plan view of a roller being smoothed by means of the invention, where a flat surfaced heated platen is used.

Figure 4 shows the heat supply means for the platen and the means for controlling this heat supply.

Figure 5 is a partly diagrammatic cross-sectional view of the apparatus forming the invention showing the general arrangement of parts illustrated in Figure 1, but in which a number of the parts have been modified.

Figure 6 is a perspective detail of the preferred form of heated platen.

Figure 7 is a detailed perspective view of the heated platen and roller, which is particularly illustrative of how the roller is built up and how any foreign bodies present are rendered innocuous.

Figures 8 and 9 illustrate the action of the platen upon a roller surface.

Figure 10 shows a knife member which may be employed in conjunction with the apparatus of my invention.

Referring now more particularly to the drawings, in the embodiment shown in Figure 1, the apparatus employed is as follows:

A metallic core 10 about which a roller is to be built up is mounted on a power rotatable mounting (not shown) such as between the chucks of a lathe. The partially built-up roller surrounding the core 10 is indicated by the numeral 11. Mounted on a laterally movable carriage, and preferably synchronized with the rotation of the core 10, in similar manner to the tool holder of a lathe, is the heated platen 12 which may be formed with the circular recess 13 in the operative face thereof, and the chamfered portion 14, or may be flat as shown in Figure 3.

Referring to Figures 1 and 4, the heated platen 12 is heated by means of the heater elements 15 and 15a which are disposed within the platen and are connected by suitable leads to a control unit 15b illustrated diagrammatically in Figure 4. The control unit includes Bourdon-type gauges 16 and 17 which are connected through the lines 16a and 17a respectively to chambers 16b and 17b illustrated in Figure 4. When the chambers are heated by heating of the platen an expansion of the gas therein occurs, and this expansion results in actuation of an indicator arm 18 on Bourdon-gauge 16 and of a contact arm 19 on Bourdon-gauge 17. The indicator arm 18 is merely employed to indicate temperature, whereas the unit 17, by means of its control arm 19 (connected to a current source 19a by the line 20) engages contacts 21 and 22 in the high heat position to cause current to flow through the element 15 by way of lead 20a, and current to flow through element 15a through the connected contacts 22, 22a and 21b so that these elements 15 and 15a are electrically in parallel. As the temperature in the platen 12 rises above a value determined by adjustment of the control unit 17 and its actuating arm 23 relative to sprocket 24 and contact arm 19, the arm will be caused to move clockwise until it engages contacts 21a and 22a, thereby connecting the element 15 in series with the resistance 25. Full heat is still supplied by element 15a since the arm 19 is engaging element 22a which is directly connected to contact 21b. If the heat continues to rise, the arm 19 will be caused to move to the next position, that is to say 21b, whereby the element 15a is alone in the electrical circuit and its full heat is supplied. At the final position, that is the contact 21c, a very low heat is provided by including the resistance 26 in series with the element 15a when the arm 19 is at this last contact.

The control unit described is of commercial design and may be obtained in various forms on the market. Certain other features may be desirable such as some means for providing a continuity of the heating circuit between the position of the contact arm 19 and contacts 21 and 22 and the positions corresponding to 21a and 22a. This can be accomplished by so closely locating these contacts that the contact arm 19, in movement from one contact to the neighbouring contact, connects both contacts contemporaneously.

Other desirable features would include an indicating arm 27, moving across scale to show the heater positions.

Mounted on the same standard as the platen 12 is the reservoir 28 which is made from heat conducting material such as thick aluminum, and is preferably covered externally by heat insulating material. The reservoir 28 is provided with a cover 29 having a filling hole 30 formed therein. The bottom of the reservoir is centrally bored and tapped at 31 to accommodate the delivery tube 32 which is screw-threaded thereinto. The delivery tube 32 is provided with a regulator in the form of the needle valve 33 which is screw-threaded into a suitable orifice 34 in the cover 29 of the reservoir 28. Means for refilling the reservoir 28 are supplied, suitably in the form of an Archimedes screw type plastic melting machine partially shown at 35 and controlled by the outlet valve 36. The heating elements 37 and 38, supplied from a suitable power source, maintain the reservoir 28 at a temperature sufficient to retain the material therein in a flowable condition.

For purposes of building up a printing roller about a metallic core, the operation of the device is as follows:

Suitable thermo-plastic material, preferably of the type described in my co-pending United States application Serial No. 735,297, issued to Patent 2,536,323, January 2, 1951, is fed into the melting machine 35 and fused. Meanwhile the platen heat supply control unit 15b is set to a suitable temperature and switched on. When using the type of plastic material set out in my above mentioned co-pending application, where the material consists to a large extent of polyvinyl chloride, I have found that a platen temperature in the region of 350–650° F. is especially suitable. In the presence of air, substantially higher temperatures tend to oxidize and break down the resins in the plastic material, while lower temperatures do not cause the plastic material to become sufficiently free-flowing to produce the desired surface finish.

When the platen and the material in the reservoir 28 have reached the desired temperature, the platen is passed longitudinally of the roller and the metallic roller core is rotated in the horizontal plane. Needle valve 33 is opened, the molten plastic material flows downward onto the roller, and a pool of molten material is formed between the roller and the platen, at the upper limit of contact between the same.

The method of producing the desired surface finish will be discussed after the alternative form of apparatus shown in Figures 5 to 9 has been described. With the apparatus shown in Figures 5 to 9 it will be understood that a similar platen heat supply and heat control means are employed as in the case of Figures 1 to 4.

In Figure 5 a continuous type of plastic feeding apparatus is shown wherein the Archimedes screw type plastic fusing machine 35a is continuously operated such as by suitable drive means 39 which feeds through the feed pipe 40 controlled by the valve 41 which may be shut off if desired and circulation of the plastic will continue via the by-pass line 42.

The re-meltable printing roller material such as a suitable thermo-plastic material is fed through the lead pipe 43 to the reservoir 44 heated by suitable heating means 45 which may surround the reservoir. The material is fed through the restrictive nozzle 46 under desired pressure to the surface of the roller 47 contacted by the platen 48 which is suitably heated as previously described. The form of platen used with the apparatus shown in Figure 5 is preferably flat-surfaced, having a flat-rolled contacting surface 49 and a downwardly sloped trailing end 50.

Assuming that the roller core 10 and/or roller is rotating and the surface of the heated platen is caused to reciprocate in a substantially horizontal plane, the contact of the heated platen with the plastic material has the effect of maintaining the pool of roller material between the roller and the platen at the upper limit of contact between them, which causes the said pool of material to flow off in a uniform ribbon-like stream at the trailing edge of the pool, in effect to helically deposit a fresh surface of fused roller material on the roller, and, through the surface tension of this deposit material, the surface of the roller formed is drawn into a smooth, true, cylindrical form, as the deposit layer cools. Moreover, it will be appreciated that any foreign material, as schematically illustrated in Figure 7, will be caused to be depressed and enter into the body of the roller. I prefer to use a form of platen formed with the sloped trailing edge 50 such as shown in Figures 6, 8 and 9, as it tends to facilitate the formation of a uniform ribbon-like stream at the trailing edge of the pool.

The effect of the operation described is readily appreciated from a consideration of Figures 7 to 9. As previouslyl indicated in the case of the vinyl type thermo-plastic resin material, the temperature is maintained in the range of 350° F. to 650° F. On the other hand, when dealing with glue-glycerin type of roller material, the temperature range will be of the order of 140 to 220° F.

It is desirable to cause the flow of roller material through the nozzle 46 from the reservoir 44 to the roller 47 and onto the platen above the point of flow-off. From an indication of the conditions of the pool of molten roller material, it is very easy to regulate the operation by adjusting either the flow thereof or the rate of feed. The R. P. M. of the roller is maintained constant throughout the whole operation and the diameter of the stream of molten plastic will necessarily bear relation to the diameter of the core. In general, I have found it desirable to rotate the roller at 15 to 40 revolutions per minute and to advance the platen at a rate of 1 to 10 inches per minute.

In the case of Figures 1 to 4, the surface finishing takes place in much the same manner as described above, with the exceptions that the plastic material is supplied through delivery tube 32 instead of nozzle 46, and the differently shaped platens may cause somewhat differing flow characteristics of the molten plastic material.

The improvement in the art of making printing rollers and/or trueing printing rollers will be clearly evident from the foregoing, and will avoid the disadvantages of the prior art where the rollers are built up from a mold, and has the result of producing a roller of true cylindrical form.

Modifications of the invention will be apparent to those skilled in the mechanical arts or in the art of making printing rollers.

An example of an obvious modification would be the elimination of the reservoirs 28 or 44. Where the reservoir is eliminated the re-meltable printing roller material could be brought to the desired temperature by the provision of an adequate heat supply in conjunction with the melting machine 35 or 35a. When this is the case, material can be fed directly from the melting machine onto the roller by means of a tube and a gear pump or some equivalent expedient.

Another modification is the provision of a knife member 51 mounted on the trailing end of the platen (see Figure 10). This knife member is provided with an elongated slot 52, and is adjustably mounted on the trailing end of the platen by means of a knurled thumb screw 53, which may be tightened to clamp the knife member in a variety of positions. Knife member 51 functions to remove any excess printing roller material provided by any of the various feeding means previously described.

Additional modifications will be apparent to those who study this specification, or employ the method and work with the apparatus of this invention. Therefore it is intended that the scope of the invention should be limited only by the nature of the sub-joined claims.

What I claim as my invention is:

1. In a method of forming a printing roller composed of a re-meltable printing roller material upon a relatively small hard core, the steps in combination of: rotating the core substantially in a horizontal plane, depositing a layer of the re-meltable roller material on the core to build a roller thereon, heating the platen and moving it into engagement with the surface of the layer on said core and on the descending side thereof as the latter rotates, maintaining said platen in contact with the surface of said layer to form a pool of roller material between the roller and the platen above the upper limit of contact between the same, and forming a ribbon-like stream of the roller material at the trailing end of the pool by moving the platen longitudinally of the roller core and layer thereon to helically distribute a fresh surface of the roller material on the roller.

2. The method according to claim 1, and the further step of heating like roller material in a container and pouring the heated roller material onto the pool of roller material and in advance of said platen.

3. The method according to claim 1, in which the core is rotated at 15 to 40 revolutions per minute, and the platen is moved longitudinally of the core at the rate of 1 to 10 inches per minute.

JAMES SPENCER.

REFERENCES CITED

The following references are of record in the file of this patent:

UNITED STATES PATENTS

| Number | Name | Date |
| --- | --- | --- |
| 1,182,982 | Crump | May 16, 1916 |
| 1,800,896 | Mitchell et al. | Apr. 14, 1931 |
| 2,033,379 | Jenkins et al. | Mar. 10, 1936 |
| 2,100,068 | Conklin | Nov. 23, 1937 |
| 2,213,980 | Ossing | Sept. 10, 1940 |